United States Patent
Tai et al.

(10) Patent No.: US 7,830,044 B2
(45) Date of Patent: Nov. 9, 2010

(54) POWER SWITCH CIRCUIT

(75) Inventors: Fang-Ta Tai, Tu-Cheng (TW); Jui-Ting Hung, Tu-Cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 268 days.

(21) Appl. No.: 12/257,364

(22) Filed: Oct. 23, 2008

(65) Prior Publication Data

US 2010/0026255 A1 Feb. 4, 2010

(30) Foreign Application Priority Data

Jul. 30, 2008 (CN) .................. 2008 1 0303231

(51) Int. Cl.
*H02J 1/00* (2006.01)
*G06F 1/26* (2006.01)
(52) U.S. Cl. ..................... 307/154; 307/75; 307/87
(58) Field of Classification Search .............. 323/267; 713/300, 310; 307/72, 75, 80, 82, 85, 86, 307/87, 154
See application file for complete search history.

(56) References Cited

U.S. PATENT DOCUMENTS

| | | | | |
|---|---|---|---|---|
| 5,809,256 | A * | 9/1998 | Najemy | 710/302 |
| 6,448,672 | B1 * | 9/2002 | Voegeli et al. | 307/52 |
| 6,768,224 | B2 * | 7/2004 | Shen et al. | 307/64 |
| 7,531,913 | B2 * | 5/2009 | Liu | 307/31 |
| 7,539,023 | B2 * | 5/2009 | Bulucea | 361/785 |
| 7,547,996 | B2 * | 6/2009 | Lan | 307/154 |
| 7,646,168 | B2 * | 1/2010 | Tseng et al. | 320/114 |
| 7,768,254 | B1 * | 8/2010 | Michael et al. | 324/142 |

* cited by examiner

*Primary Examiner*—Gary L Laxton
(74) *Attorney, Agent, or Firm*—Zhigang Ma

(57) ABSTRACT

A power switch circuit includes a connector connected to a power supply, a detecting circuit, a first switch circuit, and a first conversion circuit. The connector is connected to the detecting circuit and connected to a first power terminal of a motherboard. The connector is connected to a second power terminal of the motherboard via the first conversion circuit and the first switch circuit, the detecting circuit outputs a corresponding control signal according to a type of the power supply to turn the first switch circuit and the first conversion circuit on or off to supply power for the motherboard.

10 Claims, 2 Drawing Sheets

POWER SWITCH CIRCUIT

BACKGROUND

1. Field of the Invention

The present disclosure relates to switch circuits, and more particularly, to a power switch circuit.

2. Description of the Related Art

A multi-output power supply can output multi-voltages with different voltage value. Traditionally, a multi-output power supply has low efficiency. However, a single-output power supply has high efficiency. At present, no motherboard can be outfitted with both the multi-output power supply and the single-output power supply.

What is desired, therefore, is to provide a power switch circuit which overcomes the above problems.

DETAILED DESCRIPTION

Figure 1:
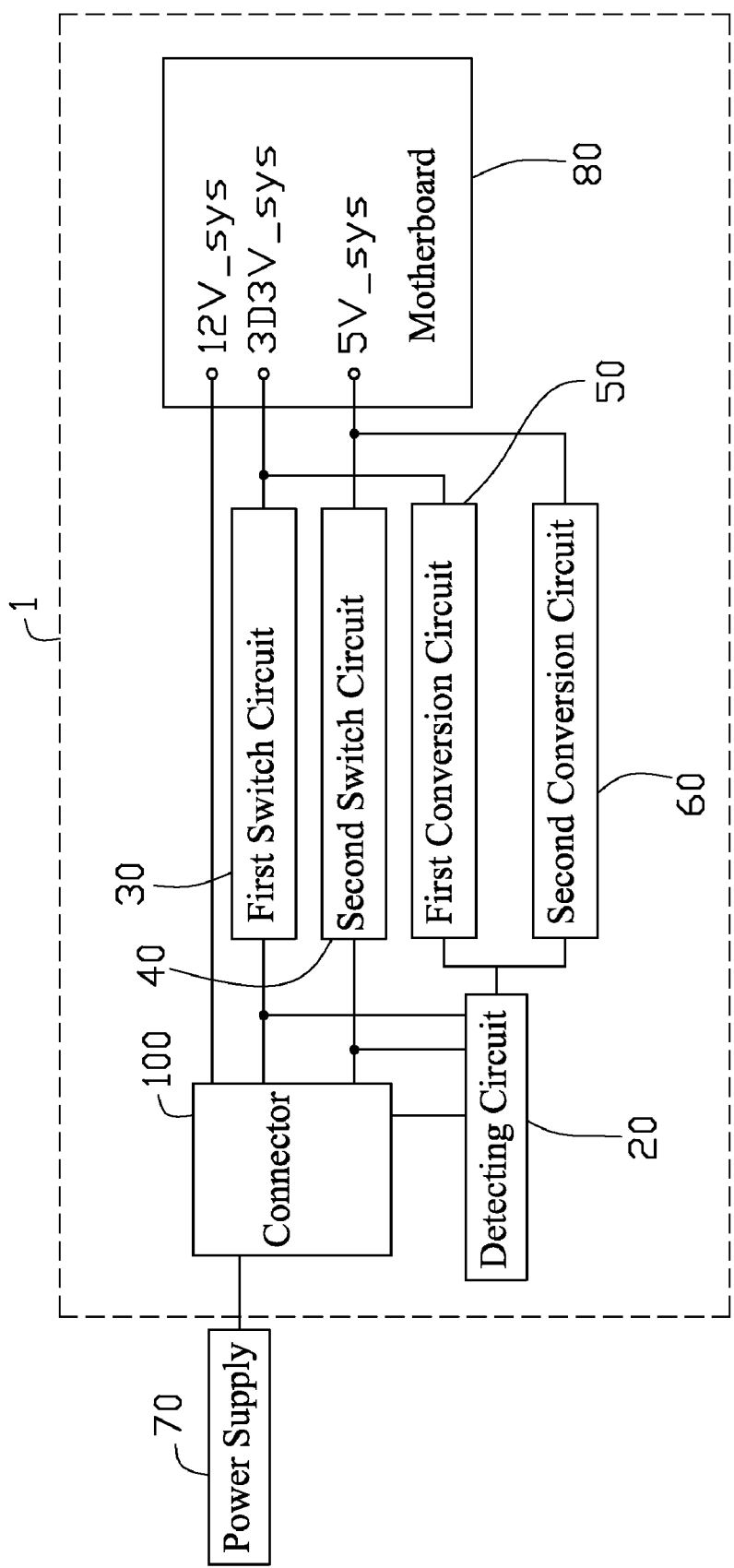
FIG. 1 is a block diagram of an exemplary power switch circuit connected between a power supply and a motherboard.

Referring to FIG. 1, an exemplary power switch circuit 1 includes a connector 100 configured for connecting to a power supply 70, a detecting circuit 20, a first switch circuit 30, a second switch circuit 40, a first conversion circuit 50, and a second conversion circuit 60.

The connector 100 is directly connected to a first power terminal 12V_sys of a motherboard 80, to supply about 12V of the power supply 70 to the motherboard 80. The connector 100 is connected to a second power terminal 3D3V_sys of the motherboard 80 via the first switch circuit 30, to supply about 3.3V of the power supply 70 to the motherboard 80. The connector 100 is connected to a third power terminal 5V_sys of the motherboard 80 via the second switch circuit 40, to supply 5V of the power supply 70 to the motherboard 80. The connector 100 is also connected to the first conversion circuit 50 via the detecting circuit 20. The second conversion circuit 50 is also connected to the second power terminal 3D3V_sys of the motherboard 80. The connector 100 is also connected to the second conversion circuit 60 via the detecting circuit 20. The second conversion circuit 60 is also connected to the third power terminal 5V_sys of the motherboard 80. The detecting circuit 20 is connected to a detecting pin 13 (shown in FIG. 2) of the connector 100 to obtain a voltage, according to a type of the power supply 70. If the power supply 70 is a single-output power supply, then the detecting circuit 20 obtains a about 5V from the detecting pin 13 of the connector 100 and outputs a first control signal to turn the first and second switch circuits 30 and 40 off, and turn the first and second conversion circuits 50 and 60 on. If the power supply 70 is a multi-output power supply, then the detecting circuit 20 obtains a about 3.3V from the detecting pin 13 (shown in FIG. 2) of the connector 100 and outputs a second control signal to turn the first and second switch circuits 30 and 40 on, and turn the first and second conversion circuits 50 and 60 off.

Figure 2:
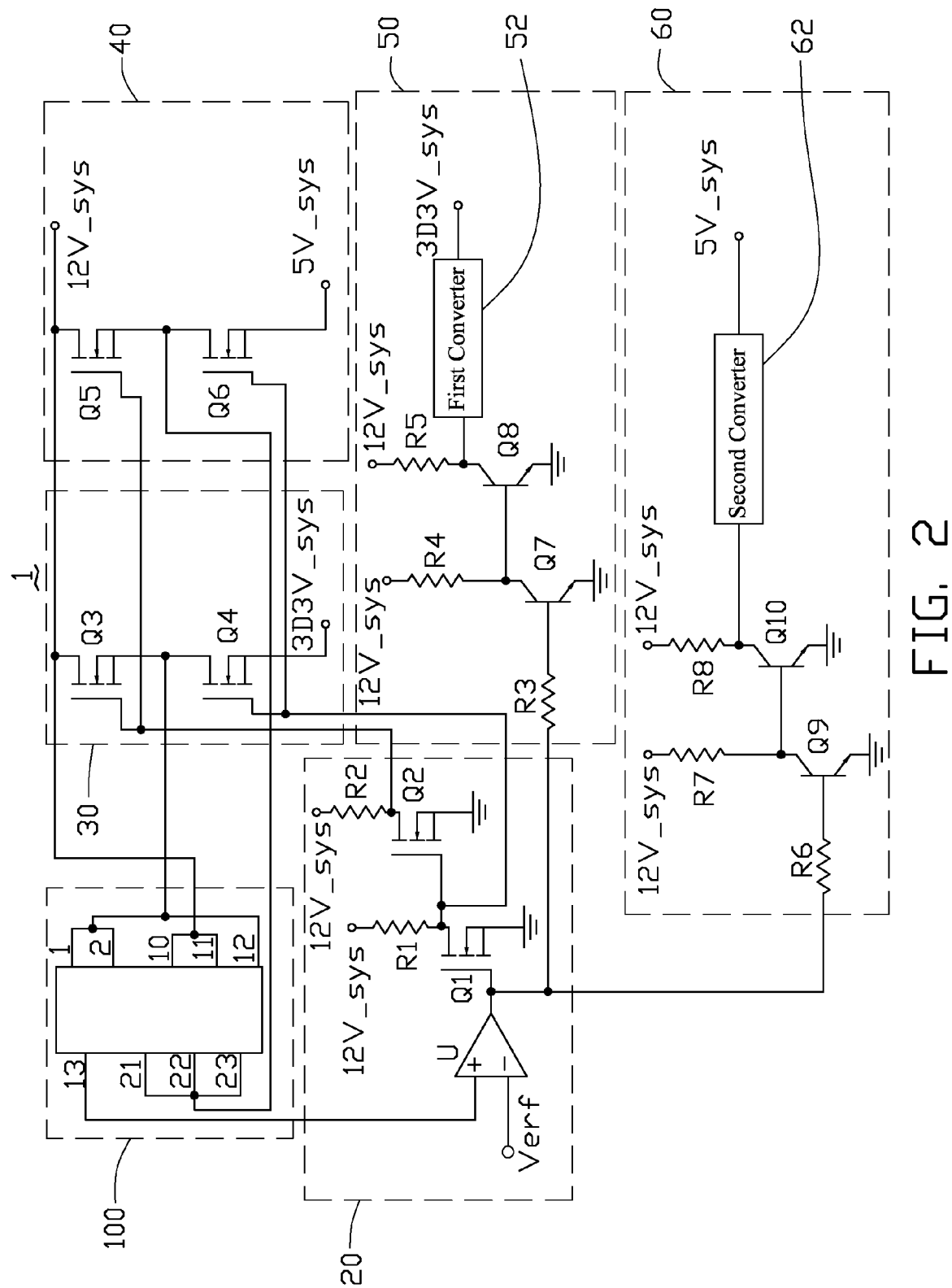
FIG. 2 is a circuit diagram of the power switch circuit of FIG. 1.

Referring to FIG. 2, the connector 100 includes a detecting pin 13, a first group of power pins 1, 2, and 12, a second group of power pins 10 and 11, and a third group of power pins 21, 22, and 23. Because of the connector's 100 pin connection, the connector 100 can mate with a multi-output power supply and a single-output power supply. If the power supply 70 is a multi-output power supply, the power supply 70 may output about 3.3V, 12V, and 5V. As a result, voltages of the first group of power pins 1, 2, and 12 are all about 3.3V, voltages of the second group of power pins 10 and 11 are both 12V, and voltages of the third group of power pins 21, 22, and 23 are all about 5V.

If the power supply 70 is a single-output power supply, the power supply 70 outputs about 12V only. As a result, voltages of the first, second, and third groups of power pins 1, 2, 12, 10, 11, 21, 22, and 23 are all about 12V.

In one embodiment, the detecting circuit 20 includes an amplifier U, a first electrical switch Q1, and a second electrical switch Q2. A non-inverting terminal of the amplifier U is connected to the detecting pin 13 of the connector 100 to obtain a voltage of the detecting pin 13 of the connector 100. A reference voltage applied to an inverting terminal of the amplifier U. A value of the reference voltage is between 3.3V and 5V in one embodiment. A first terminal of the first electrical switch Q1 is connected to an output terminal of the amplifier U. A second terminal of the first electrical switch Q1 is grounded. A third terminal of the first electrical switch Q1 is connected to the first power terminal 12V_sys of the motherboard 80 via a resistor R1. A first terminal of the second electrical switch Q2 is connected to the third terminal of the first electrical switch Q1. A second terminal of the second electrical switch Q2 is grounded. A third terminal of the second electrical switch Q2 is connected to the first power terminal 12V_sys of the motherboard 80 via a resistor R2.

The first switch circuit 30 includes a third electrical switch Q3 and a fourth electrical switch Q4. A first terminal of the third electrical switch Q3 is connected to the third terminal of the second electrical switch Q2. A second terminal of the third electrical switch Q3 is connected to the first group of power pins 1, 2, and 12 of the connector 100. A third terminal of the third electrical switch Q3 is connected to a node between the second group of power pins 10 and 11 of the connector 100 and the first power terminal 12V_sys of the motherboard 80. A first terminal of the fourth electrical switch Q4 is connected to the first terminal of the second electrical switch Q2. A second terminal of the fourth electrical switch Q4 is connected to the second power terminal 3D3V_sys of the motherboard 80. A third terminal of the fourth electrical switch Q4 is connected to the second terminal of the third electrical switch Q3.

The second switch circuit 40 includes a fifth electrical switch Q5 and a sixth electrical switch Q6. A first terminal of the fifth electrical switch Q5 is connected to the first terminal of the third electrical switch Q3. A second terminal of the fifth electrical switch Q5 is connected to the third group of power pins 21, 22, and 23 of the connector 100. A third terminal of the fifth electrical switch Q5 is connected to the third terminal of the third electrical switch Q3. A first terminal of the sixth electrical switch Q6 is connected to the first terminal of the fourth electrical switch Q4. A second terminal of the sixth electrical switch Q6 is connected to the third power terminal 5V_sys of the motherboard 80. A third terminal of the sixth electrical switch Q6 is connected to the second terminal of the fifth electrical switch Q5.

The first conversion circuit 50 includes a seventh electrical switch Q7, an eighth electrical switch Q8, and a first converter 52. A first terminal of the seventh electrical switch Q7 is connected to the first terminal of the first electrical switch Q1 via a resistor R3. A second terminal of the seventh electrical switch Q7 is grounded. A third terminal of the seventh electrical switch Q7 is connected to the first power terminal 12V_sys of the motherboard 80 via a resistor R4. A first terminal of the eighth electrical switch Q8 is connected to the third terminal of the seventh electrical switch Q7. A second terminal of the eighth electrical switch Q8 is grounded. A third terminal of the eighth electrical switch Q8 is connected to the first power terminal 12V_sys of the motherboard 80 via a resistor R5, and also connected to an input terminal of the first converter 52. An output terminal of the first converter 52 is connected to the second power terminal 3D3V_sys.

The second conversion circuit 60 includes a ninth electrical switch Q9, a tenth electrical switch Q10, and a second converter 62. A first terminal of the ninth electrical switch Q9 is connected to the first terminal of the first electrical switch Q1 via a resistor R6. A second terminal of the ninth electrical switch Q9 is grounded. A third terminal of the ninth electrical switch Q9 is connected to the first power terminal 12V_sys via a resistor R7. A first terminal of the tenth electrical switch Q10 is connected to the third terminal of the ninth electrical switch Q9. A second terminal of the tenth electrical switch Q10 is grounded. A third terminal of the tenth electrical switch Q10 is connected to the first power terminal 12V_sys via a resistor R8, and also connected to an input terminal of the second converter 62. An output terminal of the second converter 62 is connected to the third power terminal 5V_sys of the motherboard 80.

In the illustrated embodiment, the first to sixth electrical switches Q1-Q6 are insulated gate field effect (IGFE) transistors. In this embodiment, the first, second, and third terminals of the first to sixth electrical Q1-Q6 are gates, sources, and drains of the IGFE transistors. The seventh to tenth electrical switches Q7-Q10 are transistors. The first, second, and third terminals of the seventh to tenth electrical switches Q7-Q10 are bases, emitters, and collectors of the transistors. The first to tenth electrical switches Q1-Q10 can be other electrical switches according to need.

Whether the power supply 70 acts as a multi-output power supply or a single-output power supply, the power supply 70 always supply the about 12V to the first power terminal 12V_sys of the motherboard 80 via the second group of power pins 10 and 11 of the connector 100.

When the power supply 70 acts as a multi-output power supply, the detecting pin 13 of the connector 100 outputs the about 3.3V to the non-inverting of the amplifier U. The voltage of the non-inverting terminal is less than the reference voltage, which is between 3.3V-5V As a result, the output terminal of the amplifier U outputs a low level voltage. The seventh electrical switch Q7 and the ninth electrical switch Q9 are turned off. The eighth electrical switch Q8 and the tenth electrical switch Q10 are turned on. The input terminals of the first and second converters 52, 62 are at low level. As a result, the first and second converters 52 and 62 are turned off.

Because the voltage of the output terminal of the amplifier U being low level, the first electrical switch Q1 is turned off, and the second electrical switch Q2 is turned on. A voltage of the first terminal of the third electrical switch Q3 is at low level. A voltage of the first terminal of the fifth electrical switch Q5 is at low level. As a result, the third and fifth electrical switches Q3 and Q5 are turned off. A voltage of the first terminal of the fourth electrical switch Q4 is at high level. A voltage of the first terminal of the sixth electrical switch Q6 is at high level. As a result, the fourth and sixth electrical switches Q4 and Q6 are turned on. Therefore, the power supply 70 supplies the about 3.3V to the second power terminal 3D3V_sys of the motherboard 80 via the first group of power pins 1, 2, and 12 of the connector 100 and the fourth electrical switch Q4. The power supply 70 supplies about 5V for the third power terminal 5V_sys of the motherboard 80 via the third group of power pins 21, 22, and 23 of the connector 100 and the sixth electrical switch Q6.

When the power supply 70 acts as a single-output power supply, all the power pins 1, 2, 10-12, and 21-23 output about 12V The detecting pin 13 of the connector 100 output the about 5V to the non-inverting of the amplifier U. The voltage of the non-inverting terminal is greater than the reference voltage. As a result, the output terminal of the amplifier U outputs high level voltage. The seventh electrical switch Q7 and the ninth electrical switch Q9 are turned on. The eighth electrical switch Q8 and the tenth electrical switch Q10 are turned off. The input terminal of the first converter 52 and the input terminal of the second converter 62 are at high level. As a result, the first converter 52 and the second converter 62 are turned on. The first converter 52 converts the about 12V into about 3.3V, and sends the about 3.3V to the second power terminal 3D3V_sys of the motherboard 80. The second converter 62 converts the about 12V into about 5V, and sends the 5V to the third power terminal 5V_sys of the motherboard 80.

Because the output terminal of the amplifier U being at high level, the first electrical switch Q1 is turned on. The second electrical switch Q2 is turned off. A voltage of the first terminal of the fourth electrical switch Q4 is at low level. A voltage of the first terminal of the sixth electrical switch Q6 is at low level. As a result, the fourth and sixth electrical switches Q4 and Q6 are turned off. A voltage of the first terminal of the third electrical switch Q3 is at low level. A voltage of the first terminal of the fifth electrical switch Q5 is at high level. As a result, the third and fifth electrical switches Q3 and Q5 are turned off. Therefore, the power supply 70 supplies the about 12V for the first power terminal 12V_sys of the motherboard 80 directly via the second group of power pins 10 and 11 of the connector 100.

It is to be understood, however, that even though numerous characteristics and advantages of the embodiments have been set forth in the foregoing description, together with details of the structure and function of the embodiments, the disclosure is illustrative only, and changes may be made in details, especially in matters of shape, size, and arrangement of parts within the principles of the embodiments to the full extent indicated by the broad general meaning of the terms in which the appended claims are expressed.

What is claimed is:

1. A power switch circuit comprising:
a connector configured for connecting to a power supply, the connector comprising a detecting pin, a first group of power pins, and a second group of power pins connected to a first power terminal of a motherboard;
a first switch circuit connected between the first group of power pins and each of the first power terminal and a second power terminal of the motherboard;
a detecting circuit connected to the detecting pin to obtain a voltage according to a type of the power supply, and connected to the first switch circuit; and
a first conversion circuit connected between the detecting circuit and the second power terminal of the motherboard;
wherein a first voltage of the power supply is supplied to the first power terminal via the second group of power pins, the detecting circuit controls the first switch circuit and the first conversion circuit according to the voltage obtained from the detecting pin; wherein in response to the power supply is a single-output power supply, the detecting circuit outputs a first control signal to turn the first switch circuit off and turn the first conversion circuit on, the first conversion circuit converts the first voltage from the first power terminal to a second voltage to supply to the second power terminal; wherein in response to the power supply is a multi-output power supply, the detecting circuit outputs a second control signal to turn the first switch circuit on and turn the first conversion circuit off, a second voltage of the power supply is supplied to the second power terminal of the motherboard via the second group of power pins and the first switch circuit.

2. The power switch circuit as claimed in claim 1, wherein the detecting circuit comprises an amplifier, a first electrical switch, and a second electrical switch, the first electrical switch is turned on when a voltage of a gate of the first electrical switch is at high level; the second electrical switch is turned on when a voltage of a gate of the second electrical switch is at high level, the first electrical switch is turned off when the voltage of the gate of the first electrical switch is at low level; the second electrical switch is turned off when the voltage of the gate of the second electrical switch is at low level; a non-inverting terminal of the amplifier is connected to the detecting pin of the connector, a reference voltage is set on an inverting terminal of the amplifier, an output terminal of the amplifier is connected to the gate of the first electrical switch and the first conversion circuit, a source of the first electrical switch is grounded, a drain of the first electrical switch is connected to the first power terminal of the motherboard and the first switch circuit, the gate of the second electrical switch is connected to the third terminal of the first electrical switch, the source of the second electrical switch is grounded, a drain of the second electrical switch is connected to the first power terminal of the motherboard and the first switch circuit.

3. The power switch circuit as claimed in claim 2, wherein the first switch circuit comprises a third electrical switch and a fourth electrical switch, the third electrical switch is turned on when a voltage of a gate of the third electrical switch is at high level; the fourth electrical switch is turned on when a voltage of a gate of the fourth electrical switch is at high level; the third electrical switch is turned off when the voltage of the gate of the third electrical switch is at low level; the fourth electrical switch is turned off when the voltage of the gate of the fourth electrical switch is at low level, the gate of the third electrical switch is connected to a drain of the second electrical switch, the source of the third electrical switch is connected to the first group of power pins of the connector, a drain of the third electrical switch is connected to the second group of power pins of the connector, the gate of the fourth electrical switch is connected to the gate of the second electrical switch, the source of the fourth electrical switch is connected to the second power terminal of the motherboard, a drain of the fourth electrical switch is connected to the second terminal of the third electrical switch.

4. The power switch circuit as claimed in claim 3, wherein the first conversion circuit comprises a fifth electrical switch, a sixth electrical switch, and a first converter, the fifth electrical switch is turned on when a voltage of a base of the fifth electrical switch is at high level; the sixth electrical switch is turned on when a voltage of a base of the sixth electrical switch is at high level; the fifth electrical switch is turned off when the voltage of the base of the fifth electrical switch is at low level; the sixth electrical switch is turned off when the voltage of the base of the sixth electrical switch is at low level, the base of the fifth electrical switch is connected to the base of the first electrical switch of the detecting circuit, a emitter of the fifth electrical switch is grounded, a collector of the fifth electrical switch is connected to the first power terminal of the motherboard, the base of the sixth electrical switch is connected to the third terminal of the fifth electrical switch, the second terminal of the sixth electrical switch is grounded, a collector of the sixth electrical switch is connected to the first power terminal of the motherboard and connected to an input terminal of the first conversion circuit, an output terminal of the first conversion circuit is connected to the second power terminal of the motherboard.

5. The power switch circuit as claimed in claim 1, further comprising a second switch circuit and a second conversion circuit, the connector further comprises a third group of power pins, wherein the third group of power pins are connected to a third power terminal of the motherboard via the second electrical switch, the detecting circuit is connected to the third power terminal of the motherboard via the second conversion circuit, the second conversion circuit is also connected to the first power terminal of the motherboard, wherein response to the power supply is the single-output, the detecting circuit outputs the first control signal to turn the second switch circuit off and turn the second conversion circuit on, the second conversion circuit converts the first power of the first power terminal of the motherboard to a third voltage to supply to the third power terminal of the motherboard; wherein in response to the power supply is the multi-output power supply, the detecting circuit outputs the second control signal to turn the second switch circuit on and turn the second conversion circuit off, the third voltage is supplied to the third power terminal of the motherboard via the third group of pins of the connector and the second switch circuit.

6. The power switch circuit as claimed in claim 5, wherein the detecting circuit comprises an amplifier, a first electrical switch, and a second electrical switch, the first electrical switch is turned on when a voltage of a gate of the first electrical switch is at high level; the second electrical switch is turned on when a voltage of a gate of the second electrical switch is at high level; the first electrical switch is turned off when the voltage of the gate of the first electrical switch is at low level; the second electrical switch is turned off when the voltage of the gate of the second electrical switch is at low level, a non-inverting terminal of the amplifier is connected to the detecting pin of the connector, a reference voltage is set on an inverting terminal of the amplifier, an output terminal of the amplifier is connected to the gate of the first electrical switch, an output terminal of the amplifier is also connected to the first and second conversion circuits, the source of the first electrical switch is grounded, a drain of the first electrical switch is connected to the first power terminal of the motherboard, the drain of the first electrical switch is also connected to the first and second switch circuits, the gate of the second electrical switch is connected to the drain of the first electrical switch, the source of the second electrical switch is grounded, a drain of the second electrical switch is connected to the first power terminal, the drain of the second electrical switch is also connected to the first and second switch circuits.

7. The power switch circuit as claimed in claim 6, wherein the first switch circuit comprises a third electrical switch and a fourth electrical switch, the third electrical switch is turned on when a voltage of a gate of the third electrical switch is at high level; the fourth electrical switch is turned on when a voltage of a gate of the fourth electrical switch is at high level; the third electrical switch is turned off when the voltage of the gate of the third electrical switch is at low level; the fourth electrical switch is turned off when the voltage of the gate of the fourth electrical switch is at low level, the gate of the third electrical switch is connected to the third terminal of the second electrical switch, the source of the third electrical switch is connected to the first group of power pins of the connector, a drain of the third electrical switch is connected to the second group of power pins of the connector, the gate of the fourth electrical switch is connected to the gate of the second electrical switch, the source of the fourth electrical switch is connected to the second power terminal of the motherboard, a drain of the fourth electrical switch is connected to the source of the third electrical switch.

8. The power switch circuit as claimed in claim 7, wherein the first conversion circuit comprises a fifth electrical switch, a sixth electrical switch, and a first converter, the fifth electrical switch is turned on when a voltage of a base of the fifth electrical switch is at high level, the sixth electrical switch is turned on when a voltage of a base of the sixth electrical switch is at high level, the fifth electrical switch is turned off when the voltage of the base of the fifth electrical switch is at low level, the sixth electrical switch is turned off when the voltage of the base of the sixth electrical switch is at low level, the base of the fifth electrical switch is connected to the gate of the first electrical switch of the detecting circuit, the emitter of the fifth electrical switch is grounded, a collector of the fifth electrical switch is connected to the first power terminal of the motherboard, the base of the sixth electrical switch is connected to the collector of the fifth electrical switch, the emitter of the sixth electrical switch is grounded, a collector of the sixth electrical switch is connected to the first power terminal and connected to an input terminal of the first conversion circuit, an output terminal of the first conversion circuit is connected to the second power terminal of the motherboard.

9. The power switch circuit as claimed in claim 8, wherein the second switch circuit comprises a seventh electrical switch and an eighth electrical switch, the seventh electrical switch is turned on when a voltage of a gate of the seventh electrical switch is at high level; the eighth electrical switch is turned on when a voltage of a gate of the eighth electrical switch is at high level; the seventh electrical switch is turned off when the voltage of the gate of the seventh electrical switch is at low level; the eighth electrical switch is turned off when the voltage of the gate of the eighth electrical switch is at low level, the gate of the seventh electrical switch is connected to the gate of the third electrical switch, the source of the seventh electrical switch is connected to the third group of power pins of the connector, a drain of the seventh electrical switch is connected to the second group of power pins of the connector, the gate of the eighth electrical switch is connected to the gate of the fourth electrical switch, the source of the eighth electrical switch is connected to the third power terminal of the motherboard, a drain of the eighth electrical switch is connected to the source of the seventh electrical switch.

10. The power switch circuit as claimed in claim 9, wherein the second conversion circuit comprises a ninth electrical switch, a tenth electrical switch, and a second converter, the ninth electrical switch is turned on when a voltage of a base of the ninth electrical switch is at high level; the tenth electrical switch is turned on when a voltage of a base of the tenth electrical switch is at high level; the ninth electrical switch is turned off when the voltage of the base of the ninth electrical switch is at low level; the tenth electrical switch is turned off when the voltage of the base of the tenth electrical switch is at low level, the base of the ninth electrical switch is connected to the base of the first electrical switch of the detecting circuit, the emitter of the ninth electrical switch is grounded, a collector of the ninth electrical switch is connected to the first power terminal of the motherboard, the base of the tenth electrical switch is connected to the collector of the ninth electrical switch, the emitter of the tenth electrical switch is grounded, a collector of the tenth electrical switch is connected to the first power terminal of the motherboard and connected to an input terminal of the second conversion circuit, an output terminal of the second conversion circuit is connected to the third power terminal of the motherboard.

\* \* \* \* \*